United States Patent [19]

Schmidt et al.

[11] Patent Number: 4,856,727

[45] Date of Patent: Aug. 15, 1989

[54] RETRACTOR WITH CINCH

[75] Inventors: Utz H. Schmidt, Utica; Richard E. Asfour, New Baltimore, both of Mich.

[73] Assignee: TRW Vehicle Safety Systems Inc., Lyndhurst, Ohio

[21] Appl. No.: 178,972

[22] Filed: Apr. 7, 1988

[51] Int. Cl.⁴ .................. B60R 22/38; B60R 22/40
[52] U.S. Cl. .................. 242/107.4 B; 242/107.4 A; 242/107.4 R
[58] Field of Search .......... 242/107.4 B, 107.4 A, 242/107.4 R; 280/806; 297/478

[56] References Cited

U.S. PATENT DOCUMENTS

| | | | |
|---|---|---|---|
| 3,503,571 | 3/1970 | Martin | 242/107.4 B X |
| 4,327,882 | 5/1982 | Frankila et al. | 242/107.4 A |
| 4,386,745 | 6/1983 | Patel | 242/107.4 B |
| 4,427,164 | 1/1984 | Rumpf | 242/107.4 A |

FOREIGN PATENT DOCUMENTS 1022344  3/1966  United Kingdom ......... 242/107.4 B

Primary Examiner—John M. Jillions
Attorney, Agent, or Firm—Tarolli, Sundheim & Covell

[57] ABSTRACT

A seat belt retractor includes a spindle. Seat belt webbing is wound on the spindle. The spindle is supported for rotation in belt withdrawal and belt retraction directions. A mechanism is actuatable to block rotation of the spindle in the belt withdrawal direction. A disk is supported for rotation relative to the spindle to actuate the mechanism in response to rotation of the spindle in the belt withdrawal direction relative to the disk. The disk has a plurality of teeth extending therefrom. A member is manually movable toward and away from the disk. The member has a portion for engaging one of the plurality of teeth on the disk to block rotation of the disk in the belt withdrawal direction thereby enabling rotation of said spindle in the belt withdrawal direction relative to the disk upon rotation of the spindle in the belt withdrawal direction.

17 Claims, 4 Drawing Sheets

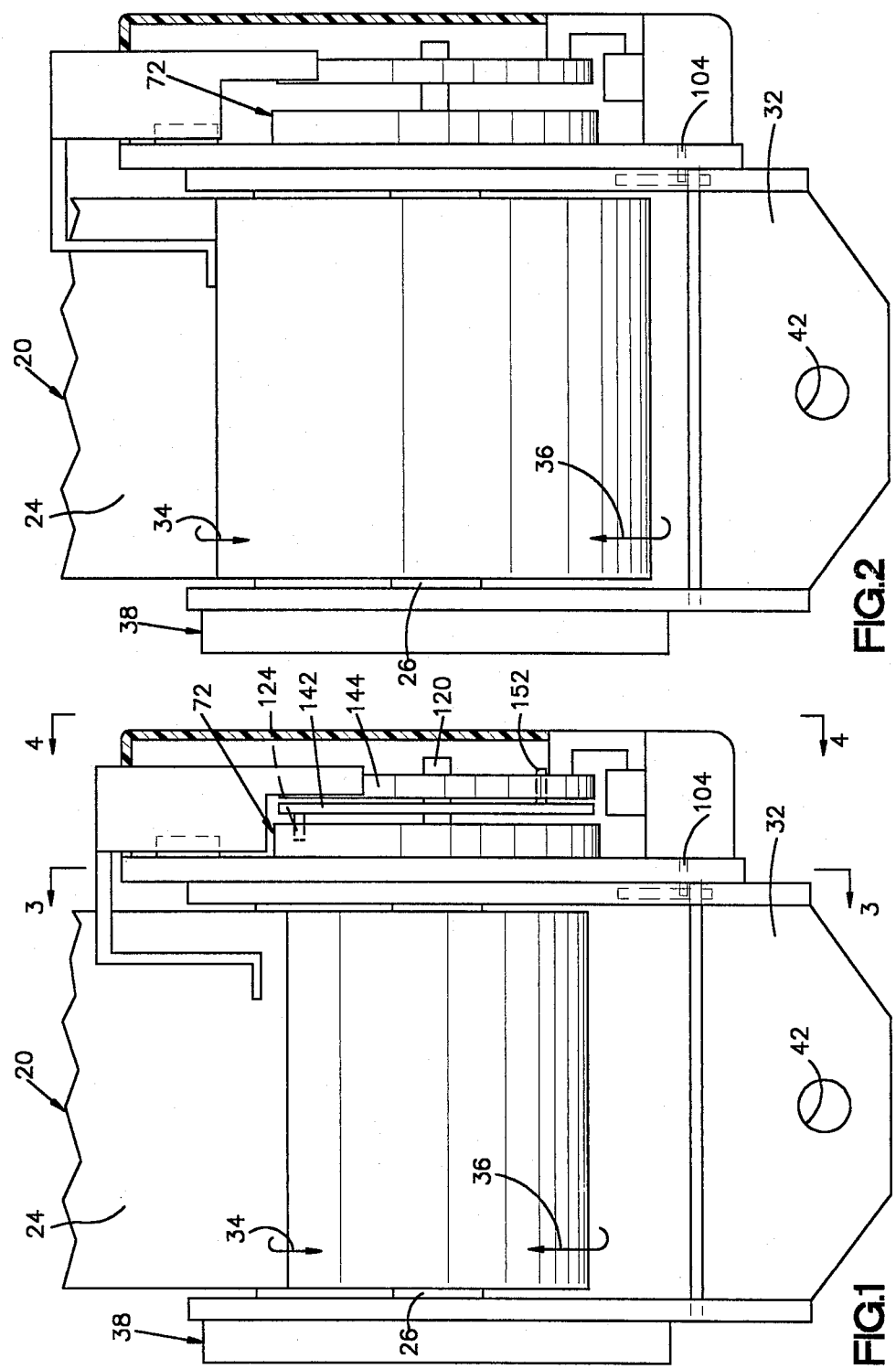

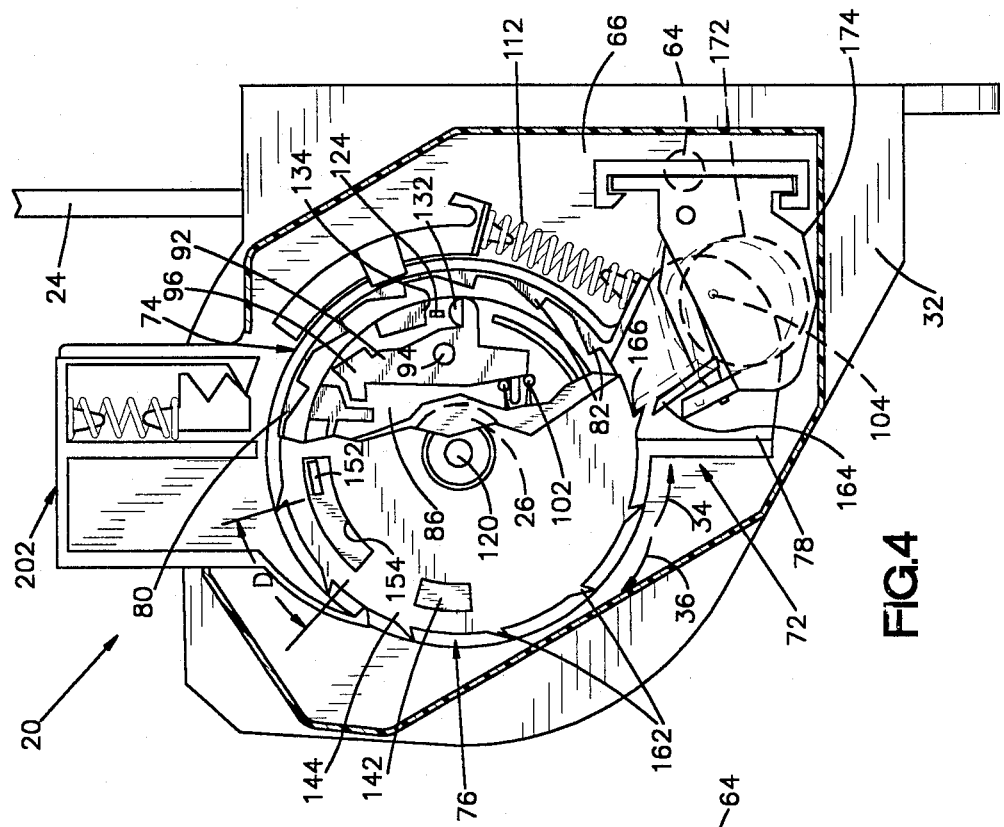
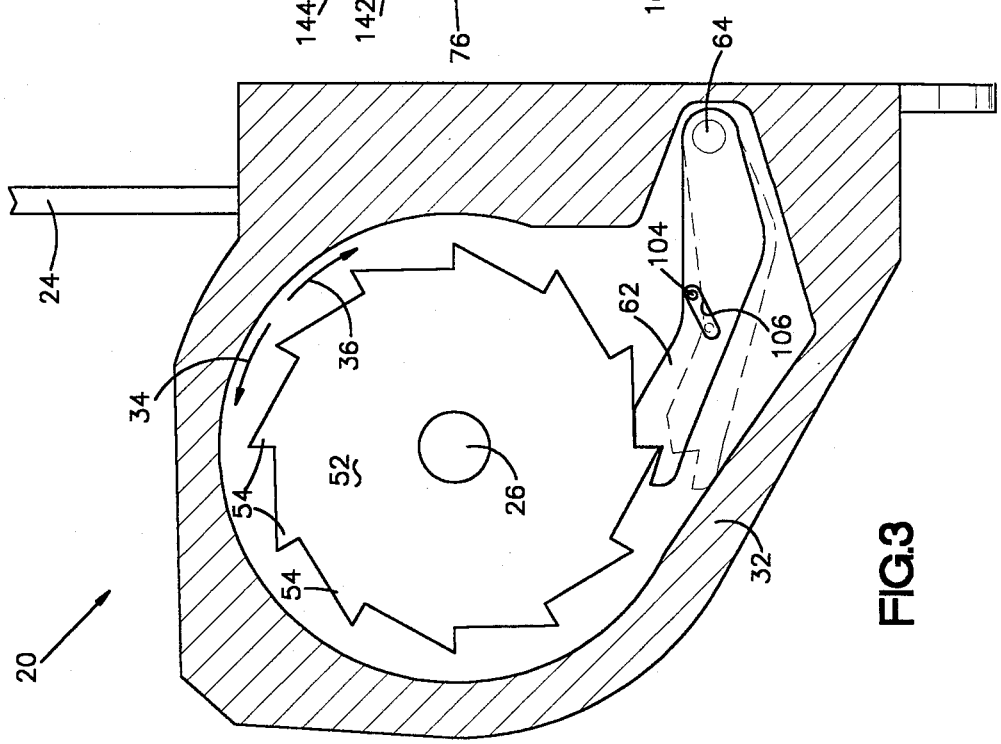

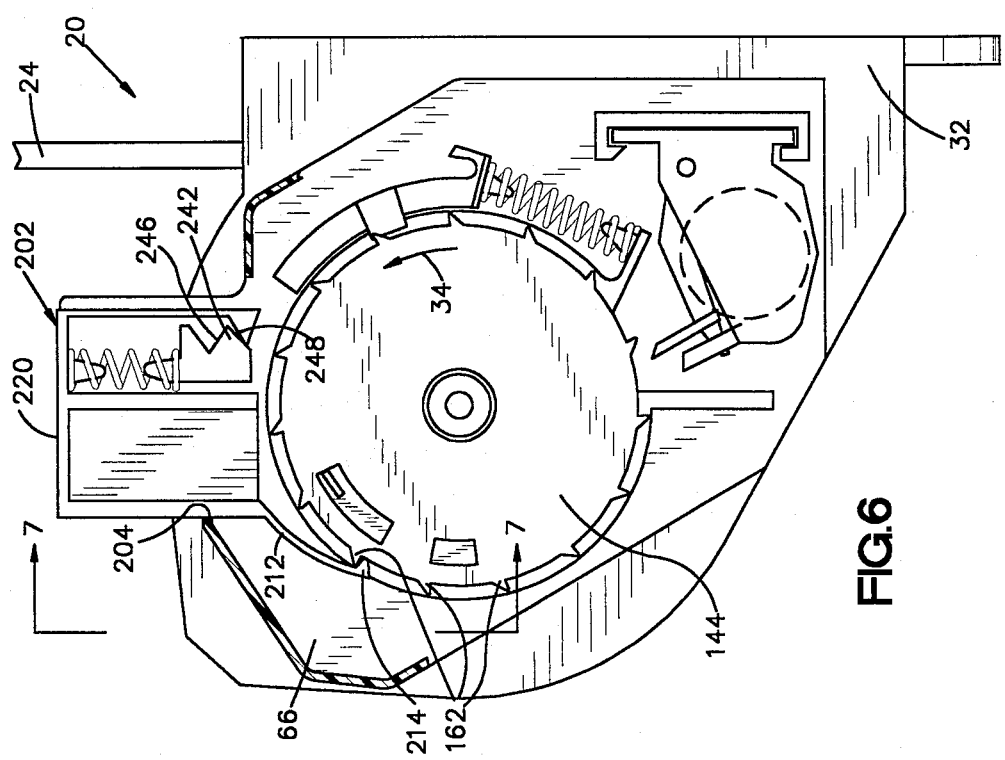
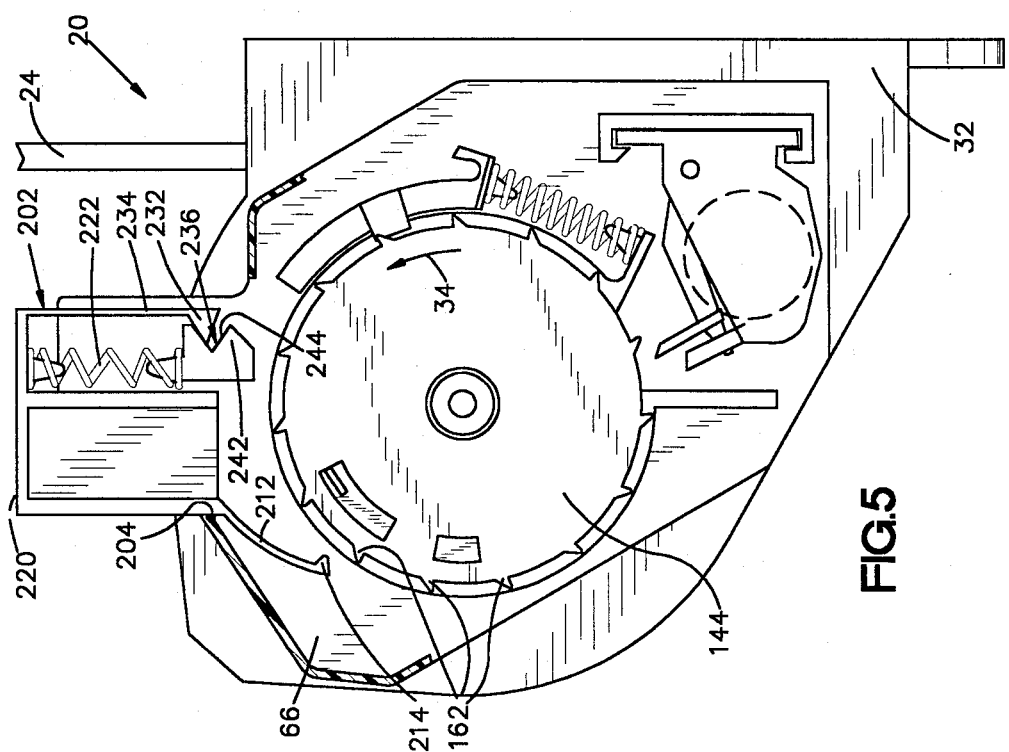

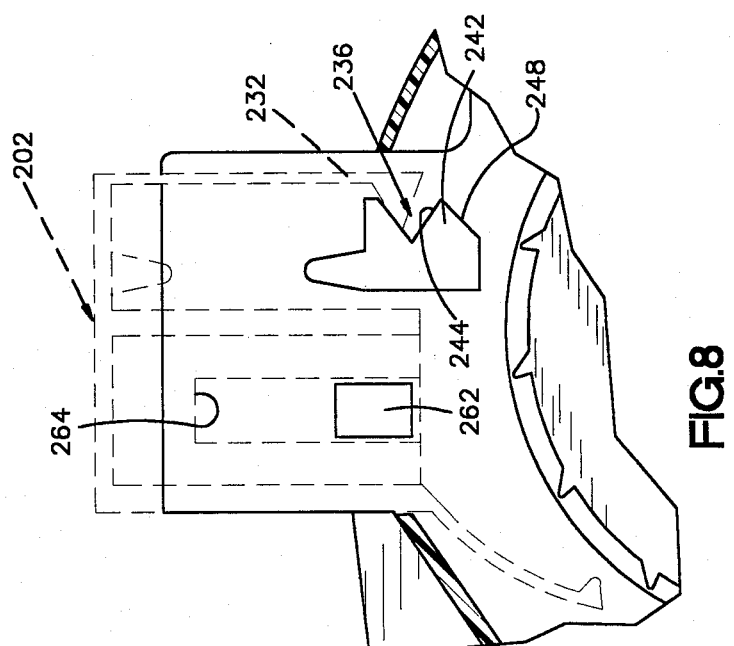
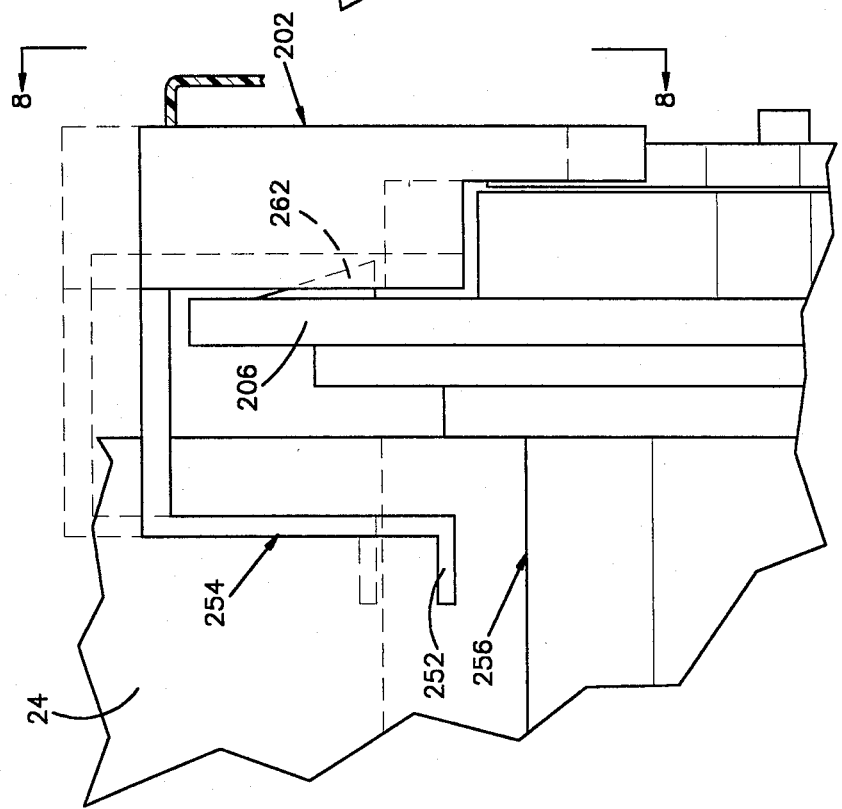

RETRACTOR WITH CINCH

BACKGROUND OF THE INVENTION

1. Field of the Invention

The present invention relates to a seat belt retractor. In particular, the present invention relates to a seat belt retractor which may be manually actuated to block the withdrawal of belt webbing from the retractor.

2. Description of the Prior Art

Seat belt retractors which may be manually actuated to block withdrawal of belt webbing are known. Such retractors are known as having a "cinch" mechanism. Such retractors are useful for securing an article, such as a package or child seat, to a vehicle seat. Such retractors are also useful for preventing an occupant from moving relative to the seat when the vehicle is travelling on a rough surface. After the belt webbing is withdrawn from the retractor and trained about the article or occupant, the cinch mechanism associated with the retractor is manually actuated. The belt webbing cannot be withdrawn any further from the retractor and the article or occupant cannot move relative to the vehicle seat.

U.S. Pat. No. 4,327,882 discloses a vehicle sensitive seat belt retractor having a cinch mechanism which is actuated by manually depressing a button. The retractor has a pair of spools. An end portion of the button forces a pawl into engagement with ratchet wheels connected to respective spools of the retractor. The pawl blocks rotation of the spools to prevent belt webbing from being withdraw from the spools. A detent on the button maintains the button in a position holding the pawl in engagement with the ratchet wheels. When belt webbing is then wound onto one of the spools, a cam rotatable with the one spool forces a lever to move the button to a position enabling the pawl to disengage the ratchet wheels.

U.S. Pat. No. 4,427,164 discloses another vehicle sensitive seat belt retractor having a cinch mechanism which is manually actuated by depressing a button. The button is connected to a lever which pivots a locking pawl. Upon depressing the button, the lever pivots the locking pawl towards ratchet wheels connected to a spool of the retractor. When the locking pawl engages the ratchet wheels, rotation of the spool in the belt withdrawal direction is blocked and belt webbing cannot be withdrawn. However, the spool can rotate in the belt retraction direction. A feeler attached to the pawl engages the belt webbing as it winds onto the spool. When a predetermined amount of the belt webbing is wound onto the spool, the feeler moves the locking pawl out of engagement with the ratchet wheels.

SUMMARY OF THE INVENTION

The present invention is directed to a web sensitive seat belt retractor which may be manually actuated to block withdrawal of seat belt webbing. When the retractor is not so actuated, the retractor locks to block withdrawal of belt webbing in response to withdrawal of the belt webbing from the retractor at a rate of acceleration above a predetermined rate of acceleration. When the retractor is manually actuated, such as by manually depressing a button, withdrawal of the belt webbing from the retractor is blocked in response to a slight amount of belt webbing withdrawal.

The seat belt retractor of the present invention includes a spindle on which belt webbing is wound. The spindle is supported for rotation in belt withdrawal and belt retraction directions. The retractor also includes a ratchet wheel connected to and rotatable with the spindle. A plurality of ratchet teeth extend from the ratchet wheel. A pawl is movable into engagement with one of the ratchet teeth on the ratchet wheel to block rotation of the spindle in the belt withdrawal direction. A disk is supported for rotation relative to the spindle. The pawl moves into engagement with one of the teeth on the ratchet wheel to block rotation of the spindle in the belt withdrawal direction in response to a predetermined amount of rotation of the spindle in the belt withdrawal direction relative to the disk. A plurality of teeth extend from the disk. A manually movable member is movable between first and second positions. The member has a cinch actuating portion spaced from the disk when the manually movable member is in its first position. When the manually movable member is in its second position, the cinch actuating portion engages one of the plurality of teeth on the disk to block rotation of the disk in the belt withdrawal direction. Thus, upon a slight amount of rotation of the spindle in the belt withdrawal direction relative to the disk, the pawl moves into engagement with one of the plurality of teeth on the ratchet wheel.

The manually movable member has a surface which is engaged to depress the member and move the member from its first position to its second position. The member also includes a cinch deactuating portion for engaging the belt webbing. When the member is in its second position and the spindle rotates in the belt retraction direction so a predetermined amount of belt webbing winds onto the spindle, the belt webbing engages the cinch deactuating portion and moves the member to its first position upon further winding of the belt webbing onto the spindle.

A detent carried by the member maintains the member in its first or second position. The detent pivots from one side of a projection attached to the retractor to another side of the projection when the member moves between the firs and second positions.

BRIEF DESCRIPTION OF THE DRAWINGS

Further features of the present invention will become apparent to those skilled in the art to which the present invention relates from reading the following specification with reference to the accompanying drawings, in which:

FIG. 1 is a view of the seat belt retractor according to the present invention;

FIG. 2 is a view similar to FIG. 1 illustrating parts of the retractor in different positions;

FIG. 3 is a cross sectional view of the retractor in FIG. 1 taken approximately along line 3—3 of FIG. 1 with parts removed;

FIG. 4 is a view of the retractor in FIG. 1 taken approximately along line 4—4 of FIG. 1 with parts broken away;

FIGS. 5 and 6 are views similar to FIG. 4 illustrating parts in different positions;

FIG. 7 is an enlarged view of a portion of the retractor in FIG. 6 taken approximately along line 7—7 of FIG. 6; and FIG. 8 is an enlarged view of a portion of the retractor in FIG. 7 taken approximately along line 8—8 of FIG. 7.

DESCRIPTION OF A PREFERRED EMBODIMENT

A seat belt retractor 20 according to the present invention is illustrated in FIG. 1. Seat belt webbing 24 extends from the retractor 20 for restraining movement of a vehicle occupant, as is known. The seat belt webbing 24 winds onto a spindle 26 of the retractor 20 for storage. A frame 32 supports the spindle 26 for rotation in a belt withdrawal direction 34 and a belt retraction direction 36. A return spring 38 biases the spindle 26 to rotate in the belt retraction direction 36 to wind the belt webbing 24 on the spindle. A fastener (not shown) extends through an opening 42 in the frame 32 to connect the retractor 20 to the vehicle, as is known.

An emergency locking ratchet wheel 52 (FIG. 3) is connected to and rotates with the spindle 26. A plurality of ratchet teeth 54 are spaced equally about the outer periphery of the ratchet wheel 52. A pawl 62 is pivotally mounted on a pivot shaft 64 which is supported in a housing 66 (FIG. 4) attached to the frame 32. The pawl 62 is pivotable into engagement with one of the plurality of teeth 54 on the ratchet wheel 52. When the pawl 62 engages a tooth 54 on the ratchet wheel 52, rotation of the ratchet wheel 52 and the spindle 26 in the belt withdrawal direction 34 is blocked.

An actuator mechanism 72 (FIG. 4) pivots the pawl 62 toward the ratchet wheel 52 to engage one of the plurality of teeth 54. The actuator mechanism 72 includes a pilot sensor 74 which pivots the pawl 62 toward the ratchet wheel 52 in response to the seat belt webbing 24 being withdrawn from the retractor 20 at a rate above a predetermined rate. The pilot sensor 74 also pivots the pawl toward the ratchet wheel 52 in response to a relatively small amount of withdrawal of seat belt webbing 24 from the retractor after acceleration or deceleration of the vehicle in any direction at a rate above a predetermined rate.

The pilot sensor 74 includes a base 78 supported by the housing 66 for a relatively small amount of relative rotation. The base 78 is biased to rotate clockwise relative to the housing 66 by a spring 112. An axially extending annular ring portion 80 is connected to the base 78. The annular ring portion 80 of the base 78 extends coaxially relative to the spindle 26. A plurality of teeth 82 are equally spaced about the inner periphery of the annular ring portion 80. A drum 86 is disposed coaxially within the annular ring portion 80 of the base 78. The drum 86 is connected to the spindle 26 for rotation with the spindle and is rotatable relative to the annular ring portion 80 of the base 78.

A pilot pawl 92 is received on a pin 94 extending axially from the drum 86. The pilot pawl 92 is pivotal about the pin 94. The pilot pawl 92 has an end portion 96 for engaging one of the teeth 82 on the annular ring portion 80 of the base 78. The pilot pawl 92 is biased away from engaging the teeth 82 by a spring 102. When the pilot pawl 92 pivots to engage one of the teeth 82 on the annular ring portion 80 of the base 78, the drum 86 and, thus, the spindle 26 are coupled to the annular ring portion of the base. When the spindle 26 and base 78 are coupled and upon rotation of the spindle 26 in the belt withdrawal direction, the base 78 rotates in a counterclockwise direction, as viewed in FIG. 4, relative to the housing 66.

A pin 104 extends from the base 78 axially opposite the annular ring portion 80 and into a slot 106 (FIG. 3) in the pawl 62. During rotation of the base 78 in the counterclockwise direction relative to the housing 66, the pin 104 engages a surface defining the slot 106 to pivot the pawl 62 about the shaft 64 in a clockwise direction, as viewed in FIG. 3, toward the ratchet wheel 52.

An inertia device 76 is supported by a shaft 120 connected to the drum 86. The shaft 120 extends coaxially relative to the spindle 26. The inertia device 76 comprises a circular metallic inertia member 142 and a circular plastic clutch disk 144. The clutch disk 144 is rotatable relative to the inertia member 142 through a relatively small arcuate distance D which is limited by a projection 152 on the inertia member 142 extending axially into an arcuate slot 154 in the clutch disk 144. The inertia device 76 is rotated by the spindle 26. The inertia member 142 also has a projection 124 extending axially into a space between an arm 132 of the pilot pawl 92 and a drive surface 134 of the drum 86. When the spindle 26 rotates in the belt retraction direction 36, the projection 124 engages the drive surface 134 of the drum 86 to rotate the inertia member 142 and, thus, the inertia device 76 in the belt retraction direction 36.

Rotation of the inertia member 142 in the belt withdrawal direction 34 lags behind rotation of the spindle 26 in the belt withdrawal direction, when the seat belt webbing 24 is withdrawn from the retractor 20 at a rate of acceleration above a predetermined rate. When rotation of the inertia member 76 lags behind rotation of the spindle 26 in the belt withdrawal direction 34, the projection 124 engages the arm 132 of the pilot pawl 92 to pivot the end portion 96 of the pilot pawl about the pin 94 radially outwardly toward the annular ring portion 80 of the base 78. The end portion 96 of the pilot pawl 92 then engages one of the teeth 82 on the annular ring portion 80 of the base 78. Further rotation of the spindle 26 in the belt withdrawal direction 34 drives the base 78 to rotate in the counterclockwise direction, as viewed in FIG. 4, relative to the housing 66 to pivot the pawl 62 towards the ratchet wheel 52.

A plurality of ratchet teeth 162 are equally spaced about the outer periphery of the clutch disk 144. A lever arm 164 is pivotable into engagement with one of the teeth 162 to block rotation of the clutch disk 144. When rotation of the clutch disk 144 in the belt withdrawal direction 34 is blocked, any withdrawal of the belt webbing 24 from the retractor rotates the spindle 26 in the belt withdrawal direction 34 relative to the clutch disk 144. This relative rotation causes the projection 124 on the inertia member 144 to move the end portion 96 of the pilot pawl 92 into engagement with a tooth 82 on the annular ring portion 80 of the base 78. Upon further withdrawal of the belt webbing 24, the pilot sensor 74 pivots the pawl 62 toward the ratchet wheel 52.

The lever arm 164 is pivoted by a spherical mass 172 supported by a cup 174. The cup 174 is attached to the frame 32. The spherical mass 172 moves within the cup 174 to pivot the lever arm 164 toward the clutch disk 144 in response to the vehicle accelerating or decelerating at a rate above a predetermined rate.

A manually movable member or button 202 (FIG. 5) is received in an opening in the housing 66 so it is accessible to a vehicle occupant. The button 202 is supported by the housing 66 for movement in a radial direction toward and away from the clutch disk 144 of the inertia device 76. The button 202 has a resiliently deflectable arm 212 with a cinch actuating portion or end portion 214. The end portion 214 of the arm 212 is for engaging one of the teeth 162 on the clutch disk 144 to block the clutch disk from rotating in the belt withdrawal direction 34. When the clutch disk 144 is blocked from rotating in the belt withdrawal direction 34 and the spindle 26 rotates in the belt withdrawal direction, the pilot sensor 74 pivots the pawl 62 toward the ratchet wheel 52 to block rotation of the spindle in the belt withdrawal direction to "cinch" or prevent withdrawal of the belt webbing 24.

The button 202 is movable between a first position away from the clutch disk 144 and a second position toward the clutch disk. In the first position, the end portion 214 of the button 202 does not engage any of the teeth 162 on the clutch disk 144, as illustrated in FIG. 5. In the second position, the end portion 214 engages one of the teeth 162 on the clutch disk 144 to block rotation of the clutch disk in the belt withdrawal direction 34, as illustrated in FIG. 6. The button 202 has a surface 220 which is manually engageable for depressing the button and moving the button from the first position to the second position.

After the belt webbing 24 is extended about an occupant or article, such as a child seat, and the return spring 38 retracts the belt webbing against the occupant or article, the button 202 is manually depressed. Depressing the button 202 moves the button from the first position to the second position to block rotation of the clutch disk 144 in the belt withdrawal direction 34. After the button 202 is moved to the second position, rotation of the spindle 26 in the belt withdrawal direction 34 relative to the clutch disk 144 will cause the pilot sensor 74 to pivot the pawl 62 toward the ratchet wheel 52 to block withdrawal of the belt webbing 24 from the retractor 20.

A spring 222 biases the button 202 to the first position so the end portion 214 of the button does not engage any of the teeth 162 on the clutch disk 144. The button 202 is maintained in this position by a detent 232. The detent 232 is carried by another resiliently deflectable arm 234 on the button 202. When the button 202 is in the first position, the detent 232 is located in a V-shaped notch 236 extending from the housing 66. A projection 242 extends axially from the housing 66 to define a lower portion of the notch 236, as viewed in FIG. 8. The resiliently deflectable arm 234 allows the detent 232 to move from one side 244 of the projection 242 to another side 248 of the projection 242 when the button 202 is moved from the first position to the second position, as illustrated in FIGS. 5 and 6. The detent 232 maintains the button 202 in the second position against the bias of the spring 222 until the button 202 is moved from the second position.

After a predetermined amount of belt webbing 24 has been retracted onto the spindle 26, the button 202 is moved from the second position. After the predetermined amount of belt webbing 24 has been retracted onto the spindle 26, an end portion 252 (FIG. 7) of a leg 254 extending from the button 202 engages a portion 256 of the belt webbing 24 wound onto the spindle, as viewed in FIGS. 2 and 7. During continued winding of the belt webbing 24 onto the spindle 26. The diameter of the portion 256 of the belt webbing 24 wound on the spindle 26 increases. The end portion 252 of the button 202 is moved radially outward from the spindle 26 by the portion 256 of the belt webbing 24 to move the button from the second position illustrated in FIG. 2 to the first position illustrated in FIG. 1. During movement of the button 202 from the second position toward the first position, the detent 232 is deflected to pivot away from the side 248 of the projection 242 and the spring 222 urges the button to the first position. The detent 232 is then relocated in the V-shaped notch 236.

A projection 262 extends axially from the housing 66 and into a slot 264 (FIGS. 7 and 8) in the button 202. The projection 262 limits movement of the button 202 upwardly as viewed in FIGS. 7 and 8. This assures that the button 202 will not become detached from the retractor 20 and housing 206 due to the biasing force of the spring 222 tending to move the button upwardly, as viewed in FIGS. 5–8.

From the above description of a preferred embodiment of the invention, those skilled in the art will perceive improvements, changes and modifications. Such improvements, changes and modifications within the skill of the art are intended to be covered by the appended claims.

Having described a specific preferred embodiment of the invention, we claim:

1. A seat belt retractor comprising:
   a spindle having seat belt webbing wound thereon, said spindle being supported for rotation in belt withdrawal and belt retraction directions;
   means for blocking rotation of said spindle in the belt withdrawal direction;
   a disk supported for rotation relative to said spindle for actuating said blocking means in response to rotation of said spindle in the belt withdrawal direction relative to said disk, said disk having a plurality of teeth extending therefrom; and
   a manually movable member having a portion for engaging one of said plurality of teeth on said disk to block rotation of said disk in the belt withdrawal direction thereby enabling rotation of said spindle in the belt withdrawal direction relative to said disk upon rotation of said spindle in the belt withdrawal direction.

2. The seat belt retractor set forth in claim 1 further including means for supporting said member for movement in a radial direction relative to said disk.

3. The seat belt retractor set forth in claim 1 further including means for biasing said member in a direction away from said disk and a surface on said member for manually engaging and moving said member in a direction toward said disk.

4. The seat belt retractor set forth in claim 1 further including a resiliently deflectable arm carried by said member for supporting said portion of said member for engaging one of said plurality of teeth on said disk.

5. The seat belt retractor set forth in claim 1 further including means for maintaining said member in a first position in which said portion of said member is disengaged from said plurality of teeth on said disk and for maintaining said member in a second position in which said portion of said member engages one of said plurality of teeth on said disk.

6. The seat belt retractor set forth in claim 5 further including means for moving said member from said second position to said first position in response to a predetermined amount of seat belt webbing being wound onto said spindle.

7. The seat belt retractor set forth in claim 5 wherein said means for maintaining said member in said first and second positions includes a detent supported for pivotal movement by said member and a projection attached to a frame of the retractor, said detent pivoting from one side of said projection to another side of said projection when said member moves between said first and second positions.

8. The seat belt retractor set forth in claim 1 wherein said means for blocking rotation of said spindle in the belt withdrawal direction comprises:
   a ratchet wheel having a plurality of teeth extending therefrom, said ratchet wheel connected to and rotatable with said spindle; and
   a pivotable pawl for engaging a tooth on said ratchet wheel to block rotation of said spindle in the belt withdrawal direction.

9. An apparatus comprising:
   a spindle having belt webbing wound thereon, said spindle being supported for rotation in belt withdrawal and belt retraction directions;
   means for blocking rotation of said spindle in the belt withdrawal direction;
   a disk supported for rotation relative to said spindle for actuating said blocking means in response to rotation of said spindle in the belt withdrawal direction relative to said disk, said disk having a plurality of teeth extending therefrom;
   a housing having a surface defining an opening; and
   a member received in the opening in said housing so said member is accessible, said member having a portion for engaging one of said plurality of teeth on said disk, said member being manually movable from a first position to a second position in which said portion engages one of said plurality of teeth on said disk to block rotation of said disk in the belt withdrawal direction thereby enabling rotation of said spindle in the belt withdrawal direction relative to said disk upon rotation of said spindle in the belt withdrawal direction, said member having a surface which is manually engageable to move said member to the second position.

10. The seat belt retractor set forth in claim 9 further including means for biasing said member to the first position.

11. The seat belt retractor set forth in claim 9 further including a resiliently deflectable arm carried by said member supporting said portion for engaging one of said plurality of teeth on said disk.

12. The seat belt retractor set forth in claim 9 further including means for maintaining said member in the first position and for maintaining said member in the second position.

13. The seat belt retractor set forth in claim 12 wherein said means for maintaining said member in said first and second positions includes a detent supported for pivotal movement by said member and a projection attached said housing, said detent pivoting from one side of said projection to another side of said projection when said member moves between the first and second positions.

14. The seat belt retractor set forth in claim 9 further including means for moving said member from the second position to the first position in response to a predetermined amount of seat belt webbing being wound onto said spindle.

15. The seat belt retractor set forth in claim 9 wherein said means for blocking rotation of said spindle in the belt withdrawal direction comprises:
   a ratchet wheel having a plurality of teeth extending therefrom, said ratchet wheel connected to and rotatable with said spindle; and
   a pivotable pawl for engaging a tooth on said ratchet wheel to block rotation of said spindle in the belt withdrawal direction.

16. A seat belt retractor comprising:
   a spindle having seat belt webbing wound thereon, said spindle being supported for rotation in belt withdrawal and belt retraction directions;
   means for blocking rotation of said spindle in the belt withdrawal direction;
   sensing means for actuating said blocking means in response to sensing rotation of said spindle in the belt withdrawal direction at a rate above a predetermined rate;
   a member manually movable from a first position to a second position and having a manually engageable surface for moving said member from the first position to the second position; and
   means actuatable in response to movement of said member to said second position for causing said sensing means to actuate said blocking means in response to rotation of said spindle in the belt withdrawal direction comprising a disk supported for rotation relative to said spindle for actuating said blocking means in response to rotation of said spindle in the belt withdrawal direction relative to said disk, said disk having a plurality of teeth extending therefrom, said member having a portion for engaging one of said plurality of teeth on said disk to block rotation of said disk in the belt withdrawal direction when said member is in the second position thereby enabling rotation of said spindle in the belt withdrawal direction relative to said disk upon rotation of said spindle in the belt withdrawal direction.

17. A seat belt retractor comprising:
   a frame;
   a spindle having seat belt webbing wound thereon, said spindle being supported for rotation by said frame in belt withdrawal and belt retraction directions;
   a ratchet wheel having a plurality of teeth extending therefrom, said ratchet wheel being connected to and rotatable with said spindle;
   a pawl pivotally supported by said frame for movement from a first position into engagement with a tooth on said ratchet wheel to block rotation of said spindle in the belt withdrawal direction;
   sensing means for moving said pawl into engagement with a tooth on said ratchet wheel in response to sensing rotation of said spindle in the belt withdrawal direction at a rate above a predetermined rate;
   a member manually movable from a first position to a second position; and
   means actuatable in response to movement of said member to said second position for causing said sensing means to move said pawl into engagement with a tooth on said ratchet wheel in response to rotation of said spindle in the belt withdrawal direction to block rotation of said spindle in the belt withdrawal direction.

* * * * *